United States Patent [19]

Whitfield et al.

[11] 4,303,445
[45] Dec. 1, 1981

[54] INK JET PRINTING FORMULATIONS

[75] Inventors: Richard G. Whitfield, Brookfield; Theodore M. Cooke, Danbury, both of Conn.

[73] Assignee: Exxon Research & Engineering Co., Florham Park, N.J.

[21] Appl. No.: 169,977

[22] Filed: Jul. 18, 1980

[51] Int. Cl.³ .............................................. C09D 11/02
[52] U.S. Cl. ...................................................... 106/22
[58] Field of Search ........................................... 106/22

[56] References Cited

U.S. PATENT DOCUMENTS

| | | | |
|---|---|---|---|
| 2,462,616 | 2/1949 | Eby et al. | 252/49.6 |
| 2,720,448 | 10/1955 | Arimoto | 44/69 |
| 2,720,449 | 10/1955 | Arimoto | 44/69 |
| 2,960,819 | 11/1960 | Steinberg et al. | 60/35.4 |
| 3,000,926 | 9/1961 | McCloskey et al. | 260/442 |
| 3,014,061 | 12/1961 | Irish et al. | 260/442 |
| 3,044,998 | 7/1962 | Emrick et al. | 260/89.5 |
| 3,214,449 | 10/1965 | Kirshenbaum et al. | 260/406 |
| 3,215,634 | 11/1965 | Walker | 252/311 |
| 3,243,449 | 3/1966 | Winnick | 260/462 |
| 3,267,177 | 8/1966 | Howald et al. | 260/865 |
| 3,342,898 | 9/1967 | Roselli | 260/867 |
| 3,538,168 | 11/1970 | Mitchell | 260/632.5 |
| 3,637,794 | 1/1972 | Sawyer et al. | 260/462 |
| 3,697,574 | 10/1972 | Piasek et al. | 260/462 R |
| 3,729,497 | 4/1973 | Sawyer et al. | 260/462 R |
| 3,738,941 | 6/1973 | Collins | 252/389 |
| 3,743,686 | 7/1973 | Koch et al. | 260/861 |
| 3,914,275 | 10/1975 | Sawyer et al. | 260/462 R |
| 3,925,223 | 12/1975 | Coffman et al. | 252/78 |
| 3,994,736 | 11/1976 | Hertz et al. | 106/22 |
| 4,021,252 | 5/1977 | Banczak et al. | 106/30 |
| 4,070,322 | 1/1978 | Hwang et al. | 260/29.6 R |
| 4,115,056 | 9/1978 | Koller et al. | 106/22 |
| 4,162,164 | 7/1979 | Lin | 106/22 |

OTHER PUBLICATIONS

Ashley et al., IBM J. Res. Dev., Jan. 1977, pp. 69–74.

*Primary Examiner*—John Kight, III
*Assistant Examiner*—Amelia B. Yarbrough
*Attorney, Agent, or Firm*—Robert S. Salzman

[57] ABSTRACT

The invention features a process and composition for reducing or eliminating moisture in fluids suitable for use in ink jet systems without significantly changing the surface tension of these fluids. It has been discovered that mixing at least one borate ester derived from an aqueously miscible organic hydroxyl-containing compound, with a substantially non-aqueous printing medium will hygroscopically stabilize the printing medium, (maintain the printing medium substantially water-free) without significantly changing its surface tension.

12 Claims, No Drawings

INK JET PRINTING FORMULATIONS

BACKGROUND OF THE INVENTION

Ink jet printing is a relatively recent development. While a number of methods for utilizing this technique have been suggested, the most common techniques involve either subjecting a continuous stream of ink droplets to a static electric field (see U.S. Pat. No. 3,596,275), or periodically generating a series of droplets in response to electrical pulses to form a discontinuous stream with sufficient energy to traverse a substantially straight trajectory to a recording medium. (See U.S. Pat. No. 3,946,398).

Various types of ink formulations have been tried in an effort to optimize the jetability of an ink as well as to ensure satisfactory adherence and resolution on the substrate being used. For example, a typical ink formulation or printing medium for use on a printable substrate comprises base liquids, which can be aqueous or non-aqueous, a coloring agent such as a dye and/or pigment material, a bacteriocide (to inhibit biological growth), and, if needed, an additive to render the ink fluid susceptible to an electric or a magnetic field.

Many inks include the addition of water to the base liquids (see e.g., U.S. Pat. No. 4,021,252), but the addition of water may increase such problems as biological growth and corrosive properties. (See Ashley et al, "Development and Characterization of Ink for an Electrostatic Ink Jet Printer", *IBM J. Res, Dev.*, (January 1977). If desired, salts such as sodium nitrite or lithium chloride may be used to increase electrical conductivity, or magnetizable particles may be added to increase magnetic susceptibility.

Properties such as viscosity, surface tension, conductivity, resistivity, specific gravity, and pH have been used to describe ink formulations and evaluate their suitability for use in the ink jet systems.

A number of problems have been noted in trying to formulate ink compositions. These problems include nozzle clogging, nozzle crusting, alterations in surface tension due to repeated exposure to the atmosphere during the jetting and recirculation of the ink fluid, print quality (including optical density and dot characteristics), and lack of adhesion of ink to the substrate. Many of these problems may be inter-related, e.g., alterations in surface properties of an ink caused by repeated exposure to the atmosphere during jetting and recirculation may cause nozzle clogging. Evaporation of a portion of the base liquid or absorbance of atmospheric moisture by the ink fluid may, for example, change the solubility of a particular pigment or dye in the ink fluid.

U.S. Pat. No. 3,994,736, discloses the use of polyhydric alcohols such as propylene glycol and ethylene glycol in the base liquid because of their ability to prevent the drying of the ink in the nozzle with subsequent clogging of the nozzle orifice. The polyhydric alcohols may be mixed with a lower monohydric alcohol to ensure rapid drying of the ink after deposition on the substrate to be printed.

It has been observed that surface tension parameters are important indications of the jetability of ink fluids. U.S. Pat. No. s4,021,252, for example, discloses the use of a primary solvent comprising a mixture of one or more aliphatic alcohols and water. The surface tension is described as "less than 40 dyne/cm.", and "preferably 30–35 dyne/cm." It will be appreciated by those skilled in the art that the addition of water, which has a surface tension of 73 dyne/cm., to ink fluids will alter the surface tension of such fluids.

In the context of non-aqueous inks having an affinity for water, there are especially troublesome problems with absorbance of atmospheric moisture during exposure of ink droplets to air during the jetting process. Since approximately 98% of the ink droplets may be recirculated, the cumulative effects of this addition of water on surface tension and coloring agent solubility can significantly alter the performance of such inks. More particularly, a change in coloring agent solubility for an ink jet fluid can lead to the precipitation of a material such as a dye or pigment out of solution, thereby resulting in clogging and crusting of the nozzle orifice. It would be desirable, therefore, to have a non-aqueous ink jet ink that is not affected by moisture and that does not experience a significant change in surface tension or undergo precipitation when exposed to moisture.

Short chain and very reactive borate esters have been used for their desiccant abilities as deicing additives in kerosene based jet fuel. (See U.S. Pat. No. 2,960,819). Certain types of borate esters have previously been used in some hydraulic fluids for their corrosion inhibiting properties. (See U.S. Pat. No. 3,738,941). Glycols and polyhydric alcohols are sometimes used in these formulations.

Borate esters, however, have never been used to formulate inks for use in ink jet systems as far as is known.

SUMMARY OF THE INVENTION

The present invention describes a process and composition for reducing or eliminating moisture in fluids suitable for use in ink jet systems without significantly changing the surface tension of these fluids. It has been discovered that mixing at least one borate ester derived from an aqueously miscible organic hydroxyl-containing compound with a substantially non-aqueous printing medium will hygroscopically stabilize the printing medium, (maintain the printing medium substantially water-free), without significantly changing its surface tension. In other words, the borate ester which is miscible with the non-aqueous printing medium, will reduce or eliminate the water in the ink system without substantially effecting its surface tension, according to the following general reaction:

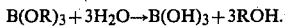

$$B(OR)_3 + 3H_2O \rightarrow B(OH)_3 + 3ROH.$$

Up to this time, however, the ability of borate esters to perform a desiccant function with little or no effect on surface tension has not been noticed or appreciated. The surface tension property is critical, because the jetability of ink jet fluids is directly related to the surface tension parameter.

As used herein, ink composition or ink formulation means a fluid containing a base liquid and one or more additives such as a coloring agent, bacteriocide, and electrically conductive or magnetically susceptible material. The term base liquid herein means one or more non-aqueous fluids.

In a preferred embodiment this invention comprises a non-aqueous composition containing at least one base liquid and an effective amount of at least one borate ester. The borate ester may be formed in the ink mixture during the ink making process or added later to the ink fluid before jetting. An effective amount of the borate ester may be formed, for example, by mixing boric acid with a base liquid comprising at least one aqueously miscible compound containing hydroxyl groups, such as monohydric or polyhydric alcohols.

Formation of the borate ester will depend on the reactivity of the hydroxyl-containing compounds with the boric acid. One of the reactions which will yield a borate ester of this invention may be represented by the following equation:

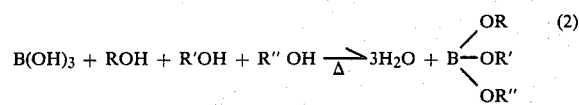  (2)

wherein R, R', and R" may be the same or different, and one or two of the R's may be H; further wherein ROH, R'OH or R"OH are aqueously miscible organic compounds of R, R', and R" which may in themselves contain additional OH groups. Another reaction which will yield a borate ester of this invention may be represented by the following equation:

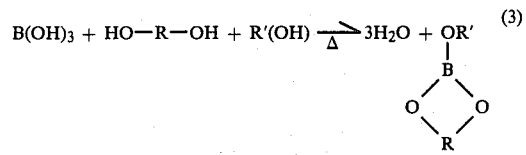  (3)

wherein R and R' may be the same or different. R, R' and R" in the above equations (2) and (3) are generally preferred to be short chain organic substances such as aliphatics of from about 1 to 10 carbon atoms, or short chain aliphatic aromatics such as benzyl alcohol. However, it should be understood that long chain organic compounds such as polyethylene glycols or polyoxyalkyls can also provide useful borate esters in the context of this invention.

Still another reaction for preparing borate esters is shown in U.S. Pat. No. 3,000,926, issued 9/19/61, which reaction, however is not preferred.

The resulting products of the above reactions (2) and (3), are found to contain a statistical distribution of different types of borate esters based on the mixture of ROH groups present in the reactants and the reactivity of these ROH groups.

The resulting products may be: monoborate esters $(RO)B(OH)_2$; diborate esters $(RO)_2B(OH)$ and $(RO)(R'O)B(OH)$; and triborate esters $(RO)_3B$; $(RO)_2(R'O)B$; $(RO)_2R"O)B$; $(RO)(R'O)(R"O)B$; and cyclic borate ester compounds such as shown in equation (3) above.

It may be feasible to have ink formulations in which the fluid medium comrprises 100% of one or more borate esters. In such a case, bis-borate esters may be present. The bis-borate esters may be one or more of the following compounds:

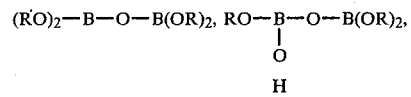

-continued

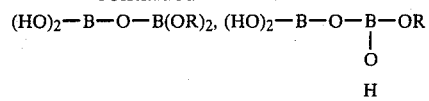

and permutations thereof including R' and R" as defined above.

The bis-borate esters can be obtained according to the following reaction:

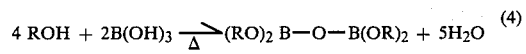  (4)

The effectiveness of any borate ester making up an ink formulation cannot be based upon a strict weight percentage of the borate esters being used, but rather must be based on the number of reactive B—O—C sites present in the particular borate ester. For example, let use consider two identical weights of borate ester, one being a trimethyl borate, and the other a tripropyl borate. Now, according to the reaction expressed in equation (1) above, the trimethyl borate will react with almost twice the amount of water than that of the tripropyl borate due to its higher concentration of active B—O—C sites per unit weight of borate ester substance.

In other words, the effectiveness of any borate ester vis-a-vis another borate ester must be expressed as the number of reactive B—O—C sites expressed in moles per unit weight, in order to make a meaningful comparison.

Therefore, the invention can be expressed in terms of a fluid composition, which has a substantially constant surface tension and which is hygroscopically stable such that it is suitable for use as an ink in ink jet systems, and which comprises a substantially non-aqueous printing medium having at least one borate ester miscible with the printing medium and derived from an aqueously miscible organic hydroxyl-containing compound.

The method of the invention can be defined as a procedure for hygroscopically stabilizing a substantially non-aqueous printing medium suitable for use in ink jet systems without substantially changing the surface tension, which procedure comprises the step of mixing with the printing medium at least one borate ester miscible with the printing medium and derived from an aqueously miscible organic hydroxyl-containing compound.

A wide variety of borate esters may be used in these ink formulations. The borate ester may either be formed at the same time the ink is being made or may be formed separately and then added to the ink.

While the use of a borate ester in an ink formulation does not significantly affect the surface tension of the fluid there is some effect on the viscosity of the fluid. It is therefore desirable to choose a base liquid such that the final viscosity of the ink formulation is suitable for ink jet systems.

It is, therefore, a particular object of this invention to provide a non-aqueous ink jet fluid suitable for use in ink jet printers that exhibits improved jet-ability.

It is a further object of this invention to produce a non-aqueous ink jet fluid whose jetability is not substantially affected by exposure to atmospheric moisture.

More specifically, it is an object of this invention to produce an ink fluid that is hygroscopically stable and has a substantially constant surface tension.

DETAILED DESCRIPTION OF THE INVENTION

Generally speaking, the invention is for a composition and method for hydroscopically stabilizing an ink jet printing medium without substantially affecting the surface tension of the printing medium.

For the purposes of definition, the phrases "hygroscopically stabilizing" or "hygroscopically stable" shall mean removing water from the printing medium, and/or maintaining the printing medium substantially water-free.

While the present invention is hereinafter described in terms of specific examples, one or ordinary skill in this art will recognize that departures from the specific terms of the examples may be made without departing from the spirit and scope of the invention.

INK FLUIDS WITH DYE

EXAMPLE 1

A mixture of 160 ml. (2.86 moles) ethylene glycol, 40 ml. (0.39 moles) benzyl alcohol, 7.7 g. (0.124 moles) boric acid, and 3.1 g. of dye (Neozapon Black RE from BASF) was prepared and heated to about 100° C. at a pressure of 25 mm. of mercury. Heat and evacuation of water were maintained until about 7 g. (about 0.36 mole) of water had been removed. The resulting black liquid had a static surface tension of about 41 dynes/cm.

EXAMPLE 2

The procedure as in Example 1 was repeated but with 5 g. (0.08 mole) of boric acid and 2 g. of dye. The mixture ws heated and water evacuated off until 4.5 g. (0.24 mole) of water had been collected.

EXAMPLE 3

A mixture of 20 ml. (0.22 mole) n-butyl alcohol, 180 ml. (3.22 moles) ethylene glycol, s4.5 g. (0.7 mole) boric acid and 4.7 g. of dye (Nigrosin SSB from American Cyanamid) was prepared and heated to about 100° C. at a pressure of about 25 mm. of mercury. Heat and evacuation of water were maintained until about 3.78 g. (0.21 mole) of water had been removed. The resulting liquid had a surface tension of 45.6 dynes/cm and a viscosity of 31.4 centipoises.

EXAMPLE 4

A mixture of 160 ml. (2.86 moles) ethylene glycol, 40 ml. (0.44 moles) n-butyl alcohol, 8.9 g. (0.14 mole) boric acid, and 4.2 g. of dyne (Nigrosin SSB) was prepared and heated to about 100° c. at a pressure of about 25 mm. of mercury. Heat and evacuation of water were maintained until 8 g. (0.42 mole) of water had been removed. The resulting liquid had a surface tension of 39.5 dyne/cm. and a viscosity of 29 centipoises.

EXAMPLE 5

The procedure as in Example 4 was repeated but with 1.1 g. of dye. The resulting liquid had a surface tension of 45.6 dynes/cm. and a viscosity of 28.0 centipoises.

EXAMPLE 6

A mixture of 80% by volume ethylene glycol, 20% by volume n-butyl alcohol, 10% by weight boric acid, and 2-5% by weight dye was heated to about 100° C. under a vacuum of about 25 mm. of mercury. The heating and evacuation of water were maintained until the volume of water collected indicated the formation of about 105 borate ester.

In order to ascertain the particular effects of borate esters on the surface tension and viscosity of non-aqueous fluids, examples were run without any other additive, e.g., a coloring agent.

INK FLUIDS WITHOUT DYE

EXAMPLE 7

A mixture was prepared with 160 ml. (2.86 moles) ethylene glycol, 40 ml. (0.39 mole) benzyl alcohol and 7.65 g. (0.124 mole) boric acid. The mixture was heated to about 100° c. at a pressure of 25 mm. of mercury. Water was evacuated until 6.7 g. (0.372 mole) of water had been removed. The resulting liquid had a surface tension of 44.5 dynes/cm. and a viscosity of 22.5 centipoises.

EXAMPLE 8

A mixture was prepared with 180 ml. (3.22 moles) ethylene glycol, 20 ml. (0.22 mole) n-butyl alcohol, and 4.47 g. (0.24 mole) boric acid. This mixture was heated to about 100° C. at a pressure of 25 mm. of mercury. Water was evacuated until 13 g. (0.72 mole) of water had been removed. The resulting liquid had a surface tension of 43.7 dynes/cm. and a viscosity of 21.9 centipoises.

EXAMPLE 9

A mixture was prepared with 160 ml. (2.86 moles) ethylene glycol, 40 ml. (0.39 mole) benzyl alcohol and 8.88 g. (0.14 mole) boric acid. The mixture was heated to about 100° C. at a pressure of 25 mm. of mercury. Water was evacuated until 7.56 g. (0.42 mole) of water had been removed. The resulting liquid had a surface tension of 36.5 dynes/cm. and a viscosity of 20.4 centipoises.

EXAMPLE 10

A mixture was prepared with 100 ml. (1.79 mole) ethylene glycol, 100 ml. (0.975 mole) benzyl alcohol, and 7.65 g. (0.124 mole) boric acid. This mixture was heated to about 100° C. at a pressure of 25 mm. of mercury. Water was evacuated until 6.7 g. (0.372 mole) of water had been removed. The resulting liquid had a surface tension of 43.6 dyne/cm. and a viscosity of 17.1 centipoises.

EXAMPLE 11

A mixture was prepared with 40 ml. (0.715 mole) ethylene glycol, 160 ml. (1.56 mole) benzyl alcohol, and 7.65 g. (0.124 mole) boric acid. This mixture was heated to about 100° C. at a pressure of 25 mm. of mercury. Water was evacuated until 6.7 g. (0.372 mole) of water had been removed. The resulting liquid had a surface tension of 42.5 dynes/cm. and a viscosity of 10 centipoises. This fluid gave especially satisfactory results upon jetting.

Having thus described this invention, what is desired to be protected by Letters Patent is presented by the following appended claims.

What is claimed is:

1. A fluid composition which has a substantially constant surface tension and which is hygroscopically stable such that it is suitable for use as an ink in ink jet systems comprising a substantially non-aqueous printing medium having at least one borate ester miscible with said printing medium and derived from an aqueously miscible organic hydroxyl-containing compound.

2. The fluid composition of claim 1, further comprisisng a polyhydric alcohol admixed with a monohydric alcohol.

3. The fluid composition of claim 2 wherein said fluid composition comprises from about 5% to about 30% by volume n-butyl alcohol and from about 95% to about 70% by volume ethylene glycol.

4. The fluid composition of claim 3 wherein said fluid composition comprises from about 10% to about 90% by volume benzyl alcohol and from about 90% to about 10% by volume ethylene glycol.

5. The fluid composition of claim 1 wherein said borate ester is a bis-borate ester.

6. The fluid composition of claim 1, wherein said borate ester is derived from a polyethylene glycol.

7. The fluid composition of claim 1, wherein said borate ester is derived from a hydroxyl-containing polyoxyalkyl.

8. The fluid composition of claim 1, wherein said borate ester is derived from a hydroxyl-containing aliphatic compound of from 1 to 10 carbon atoms.

9. The fluid composition of claim 1, wherein said borate ester is derived from a hydroxyl-containing short chain aliphatic aromatic compound.

10. A method for hygroscopically stabilizing a substantially non-aqueous printing medium suitable for use in ink jet systems without substantially changing the surface tension of said printing medium comprising the step of mixing with said printing medium at least one borate ester, miscible with said printing medium and derived from an aqueously miscible organic hydroxyl-containing compound.

11. The method of claim 10, wherein said at least one borate ester is formed in said printing medium.

12. The method of claim 10, wherein said at least one borate ester is formed separately and added to said printing medium.

* * * * *